United States Patent
Yamanaka et al.

(10) Patent No.: US 10,192,126 B2
(45) Date of Patent: Jan. 29, 2019

(54) BEHAVIOR RECOGNITION APPARATUS, LEARNING APPARATUS, AND METHOD

(71) Applicant: TOYOTA JIDOSHA KABUSHIKI KAISHA, Toyota-shi, Aichi-ken (JP)

(72) Inventors: Masao Yamanaka, Tokyo (JP); Toshifumi Nishijima, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/492,367

(22) Filed: Apr. 20, 2017

(65) Prior Publication Data

US 2017/0351928 A1 Dec. 7, 2017

(30) Foreign Application Priority Data

Jun. 1, 2016 (JP) .................. 2016-110288

(51) Int. Cl.
| | |
|---|---|
| *G06K 9/00* | (2006.01) |
| *G06K 9/46* | (2006.01) |
| *G06K 9/66* | (2006.01) |
| *G06T 7/70* | (2017.01) |
| *H04N 5/33* | (2006.01) |
| *G06T 7/143* | (2017.01) |

(52) U.S. Cl.
CPC ....... *G06K 9/00845* (2013.01); *G06K 9/4604* (2013.01); *G06K 9/66* (2013.01); *G06T 7/143* (2017.01); *G06T 7/70* (2017.01); *H04N 5/33* (2013.01); *G06K 9/00369* (2013.01); *G06T 2207/20076* (2013.01); *G06T 2207/30196* (2013.01)

(58) Field of Classification Search
CPC ............ B60W 40/08; B60W 40/0818; B60W 40/0872; B60W 40/09; G06K 9/00845; G06K 9/00335; G06K 9/00362; G06K 9/00369; G06K 9/00832
See application file for complete search history.

(56) References Cited

U.S. PATENT DOCUMENTS 9,751,535 B1 * 9/2017 Fields .................. B60W 40/09
9,864,918 B2 * 1/2018 Micks ................ G06K 9/00355
(Continued)

OTHER PUBLICATIONS

Wang, Heng et al. "Dense Trajectories and Motion Boundary Descriptors for Action Recognition", International Journal of Computer Vision, 2013, 103.1: 60-79.
(Continued)

*Primary Examiner* — Wesley J Tucker
(74) *Attorney, Agent, or Firm* — Oliff PLC

(57) ABSTRACT

Provided is a behavior recognition apparatus, including a detection unit configured to detect, based on a vehicle interior image obtained by photographing a vehicle interior, positions of a plurality of body parts of a person inside a vehicle in the vehicle interior image; a feature extraction unit configured to extract a rank-order feature which is a feature based on a rank-order of a magnitude of a distance between parts obtained by the detection unit; and a discrimination unit configured to discriminate a behavior of an occupant in the vehicle using a discriminator learned in advance and the rank-order feature extracted by the feature extraction unit. Also provided is a learning apparatus to learn the discrimination unit.

16 Claims, 7 Drawing Sheets

(56) References Cited

U.S. PATENT DOCUMENTS

| | | | | |
|---|---|---|---|---|
| 2005/0131607 A1* | 6/2005 | Breed | ................. | B60N 2/002 |
| | | | | 701/45 |
| 2013/0066526 A1* | 3/2013 | Mondragon | ............. | G09G 5/00 |
| | | | | 701/48 |
| 2016/0046298 A1* | 2/2016 | DeRuyck | .............. | B60W 40/09 |
| | | | | 340/576 |

OTHER PUBLICATIONS

Goutsu, Yusuke et al. "Gesture Recognition using Hybrid Generative-Discriminative Approach with Fisher Vector", 2015 IEEE International Conference on Robotics and Automation (ICRA). IEEE, 2015. p. 3024-3031.

Schwarz, Max et al. "RGB-D Object Recognition and Pose Estimation based on Pre-trained Convolutional Neural Network Features", 2015 IEEE International Conference on Robotics and Automation (ICRA). IEEE, 2015.

A. Toshev et al., "DeepPose: Human Pose Estimation via Deep Neural Networks", CVPR2014.

Breiman, Leo. "Random Forests", Machine Learning, 2001, 45.1: 5-32.

Weston, Jason et al. "Multi-class Support Vector Machines", Technical Report CSD-TR-98-04, Department of Computer Science, Royal Holloway, University of London, May 1998.

Sugiyama, Masashi. "Superfast-Trainable Multi-Class Probabilistic Classifier by Least-Squares Posterior Fitting". IEICE Transactions on Information and Systems, 2010, 93.10.

\* cited by examiner

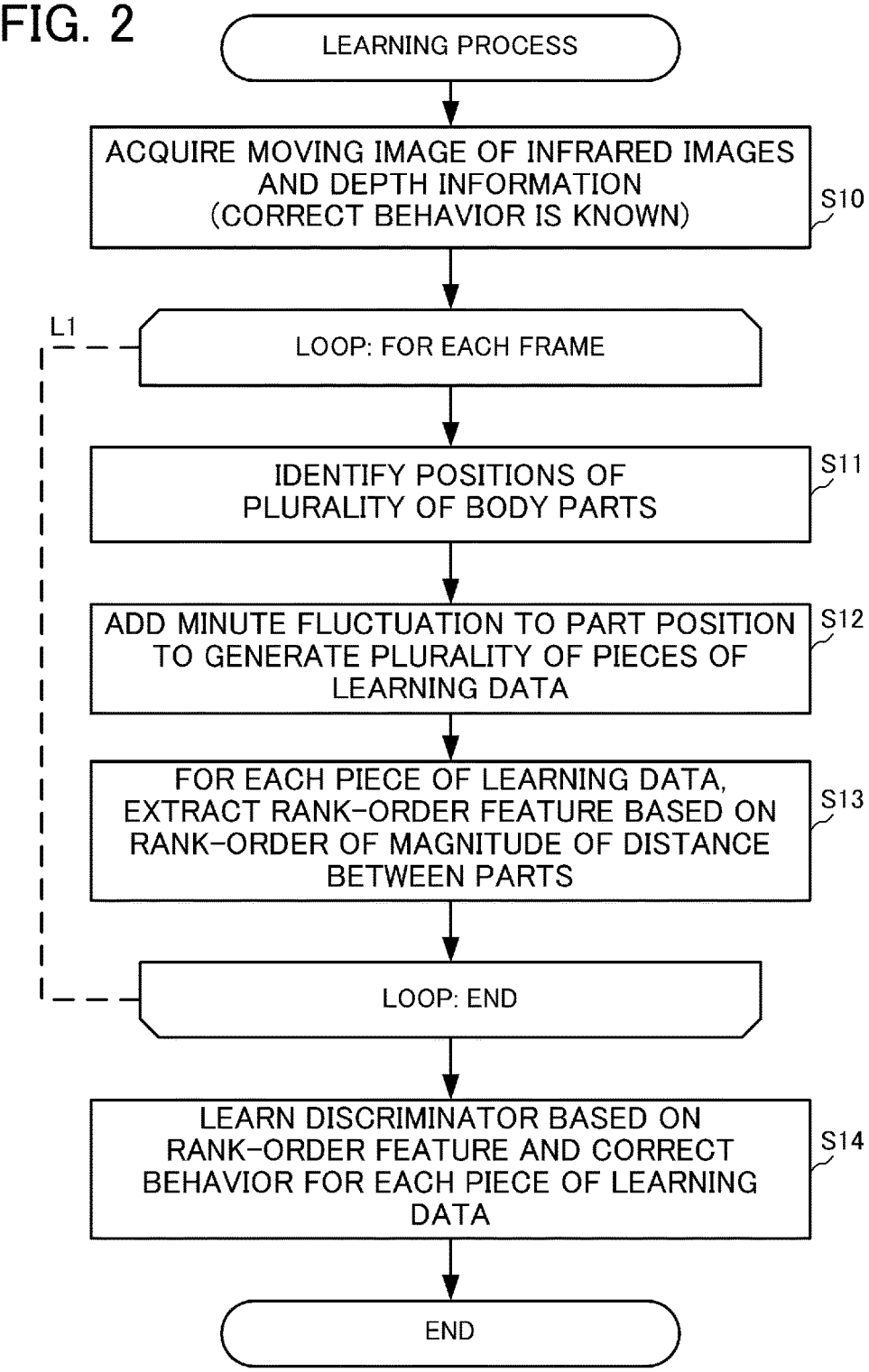

① $(x_1(t), y_1(t), z_1(t))$
② $(x_2(t), y_2(t), z_2(t))$
③ $(x_3(t), y_3(t), z_3(t))$
④ $(x_4(t), y_4(t), z_4(t))$
⑤ $(x_5(t), y_5(t), z_5(t))$
⑥ $(x_6(t), y_6(t), z_6(t))$
⑦ $(x_7(t), y_7(t), z_7(t))$
⑧ $(x_8(t), y_8(t), z_8(t))$
⑨ $(x_9(t), y_9(t), z_9(t))$
⑩ $(x_{10}(t), y_{10}(t), z_{10}(t))$

① $(X_1(t)+\Delta X_1, Y_1(t)+\Delta Y_1, z_1(t))$
② $(X_2(t)+\Delta X_2, Y_2(t)+\Delta Y_2, z_2(t))$
③ $(X_3(t)+\Delta X_3, Y_3(t)+\Delta Y_3, z_3(t))$
④ $(X_4(t)+\Delta X_4, Y_4(t)+\Delta Y_4, z_4(t))$
⑤ $(X_5(t)+\Delta X_5, Y_5(t)+\Delta Y_5, z_5(t))$
⑥ $(X_6(t)+\Delta X_6, Y_6(t)+\Delta Y_6, z_6(t))$
⑦ $(X_7(t)+\Delta X_7, Y_7(t)+\Delta Y_7, z_7(t))$
⑧ $(X_8(t)+\Delta X_8, Y_8(t)+\Delta Y_8, z_8(t))$
⑨ $(X_9(t)+\Delta X_9, Y_9(t)+\Delta Y_9, z_9(t))$
⑩ $(X_{10}(t)+\Delta X_{10}, Y_{10}(t)+\Delta Y_{10}, z_{10}(t))$

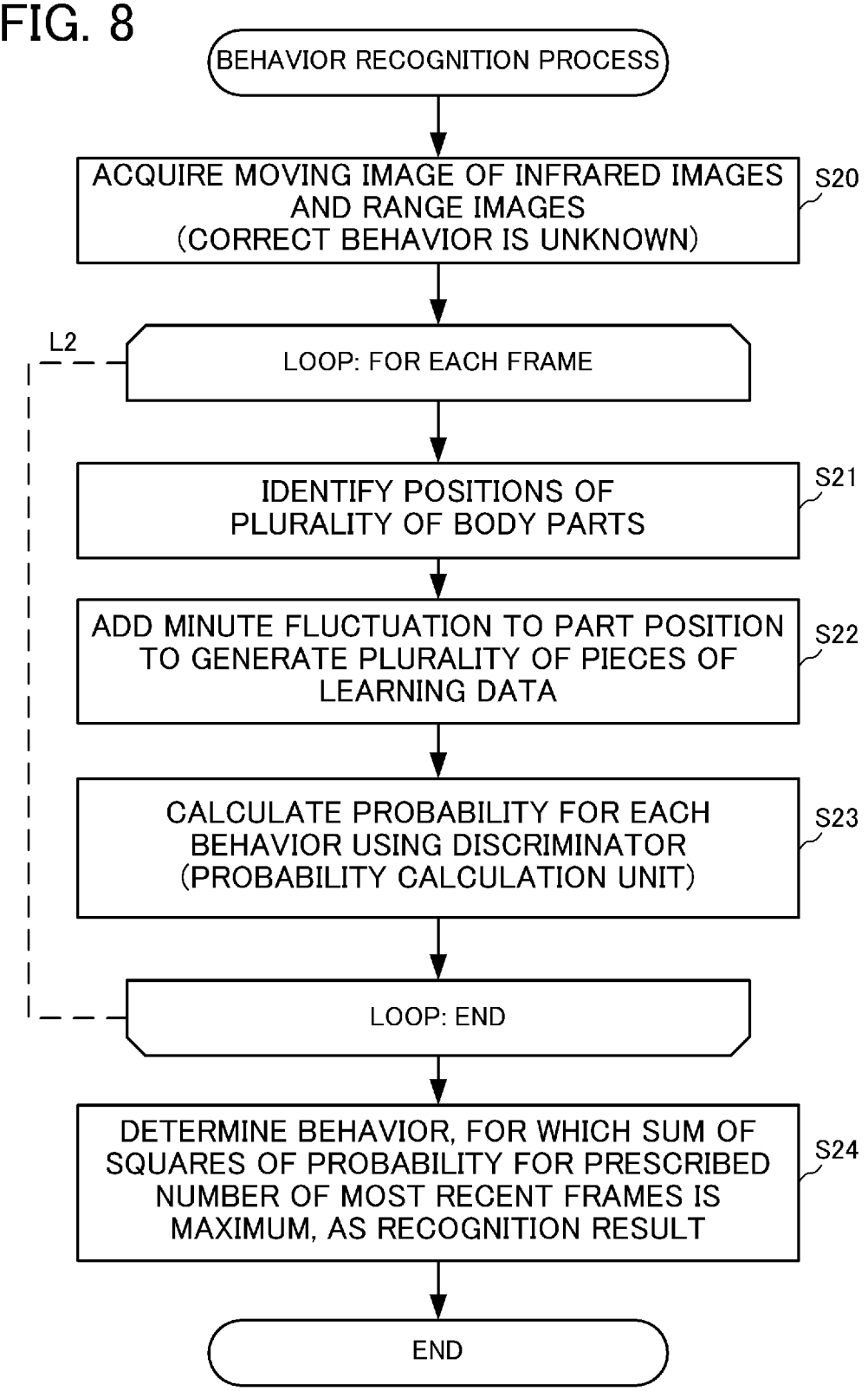

BEHAVIOR RECOGNITION APPARATUS, LEARNING APPARATUS, AND METHOD

BACKGROUND OF THE INVENTION

Field of the Invention

The present invention relates to a technique for recognizing behavior of an occupant in a vehicle.

Description of the Related Art

As a method of recognizing behavior of an occupant in a vehicle, for example, a proposed method is described in Wang et al. [1], which discloses: creating a plurality of images (a pyramid image) with different resolutions from an input image, and detecting points of interest at high density from the pyramid image. For each of a plurality of trajectories obtained by tracking a plurality of points of interest in a time direction, a plurality of types of image features such as HOG, HOF, and MBH are extracted. These image features are coupled in a dimension direction and converted into image features with a higher description capability using a Bag-of-Features representation. Finally, for each behavior considered a discrimination target, a discriminator is generated (learned) using a nonlinear support vector machine (SVM) which uses an obtained image feature as an input.

In addition, as another method of recognizing behavior of an occupant in a vehicle, for example, a proposed method is described in Goutsu et al. [2], which discloses: detecting a position of a body part at each time point with a depth sensor, and extracting a first feature using a hidden Markov model (HMM) using a detected position as an input. Furthermore, by applying a Fisher kernel to the first feature, the first feature is converted into a second feature (a Fisher vector) with a higher description capability. Finally, a discriminator is generated (learned) using a nonlinear SVM which uses, as an input, the second feature extracted for each behavior considered a discrimination target.

However, Wang et al. [1] has a disadvantage in that an amount of extracted features becomes enormous. This is because points of interest are extracted at high density from an image space and, for each obtained trajectory, a plurality of types of image features are extracted. Wang et al. [1] also has a problem in that, in addition to the learning process of a discriminator being time-consuming, a discrimination process using the discriminator also requires a long period of time.

In addition, Goutsu et al. [2] has a problem in that, while a behavior intended by a person in a moving image such as a gesture can be effectively recognized, it is difficult to recognize a dangerous behavior not intended by the person in the moving image.

(1) WANG, Heng, et al. Dense trajectories and motion boundary descriptors for action recognition. International journal of computer vision, 2013, 103.1: 60-79.
(2) GOUTSU, Yusuke; TAKANO, Wataru; NAKAMURA, Yoshihiko. Gesture recognition using hybrid generative-discriminative approach with fisher vector. In: Robotics and Automation (ICRA), 2015 IEEE International Conference on. IEEE, 2015. p. 3024-3031.
(3) SCHWARZ, Max; SCHULZ, Hannes; BEHNKE, Sven. RGB-D object recognition and pose estimation based on pre-trained convolutional neural network features. In: Robotics and Automation (ICRA), 2015 IEEE International Conference on. IEEE, 2015. p. 1329-1335.
(4) A. Toshev et al., DeepPose: Human Pose Estimation via Deep Neural Networks, CVPR2014
(5) BREIMAN, Leo. Random forests. Machine learning, 2001, 45.1: 5-32.
(6) WESTON, Jason; WATKINS, Chris. Multi-class support vector machines. Technical Report CSD-TR-98-04, Department of Computer Science, Royal Holloway, University of London, May, 1998.
(7) SUGIYAMA, Masashi. Superfast-trainable multi-class probabilistic classifier by least-squares posterior fitting. IEICE Transactions on Information and Systems, 2010, 93.10: 2690-2701.

SUMMARY OF THE INVENTION

An aspect of the present invention is a novel and innovative method for enabling a behavior of an occupant in a vehicle to be accurately recognized.

A first embodiment of the present invention is a behavior recognition apparatus, including:

a detection unit configured to detect, based on a vehicle interior image obtained by photographing a vehicle interior, positions of a plurality of body parts of a person inside a vehicle in the vehicle interior image;

a feature extraction unit configured to extract a rank-order feature which is a feature based on a rank-order of a magnitude of a distance between parts obtained by the detection unit; and a discrimination (classification) unit configured to discriminate a behavior of an occupant in the vehicle using a discriminator learned in advance and the rank-order feature extracted by the feature extraction unit.

A position of a part of the person inside the vehicle may be obtained by also taking a range image (depth information) corresponding to the vehicle interior image into consideration. In addition, the distance between parts may be a distance in the vehicle interior image (a two-dimensional distance) or a three-dimensional distance which also takes depth information into consideration.

Since the present embodiment uses a feature (a rank-order feature) based on a rank-order of a magnitude of a distance between body parts, the present embodiment is robust with respect to a scale fluctuation, a rotation, and a parallel translation of a human body in an input image. Therefore, the present embodiment is capable of realizing accurate recognition and suppressing adverse effects of a horizontal movement of a seat position, a difference in physiques among occupants, a position or an orientation of a camera, and the like.

The discriminator described above may be generated by decision tree learning. For example, the discriminator may be generated in accordance with a Random Forests algorithm. In this case, as conditions for determining a branch at each node in a decision tree, determination conditions based on a magnitude relationship between a rank-order of a magnitude of a distance between a first pair of body parts and a rank-order of a magnitude of a distance between a second pair of body parts may be adopted. The discriminator described above may be configured to determine a correspondence of input information with any of a plurality of behaviors determined in advance or to calculate a likelihood (probability) with respect to each of the plurality of behaviors.

Alternatively, the discriminator described above may be generated by any statistical machine learning methods other than decision tree learning such as support vector machine (SVM), least squares probabilistic classification, Bayesian estimation, and neural networking.

Although a behavior of an occupant in a vehicle may be determined based on only one image, the behavior of an occupant in a vehicle is favorably recognized based on a plurality of images or, more specifically, based on a moving image constituted by a plurality of frames. In this case, with respect to images of the plurality of frames constituting the moving image, the behavior recognition apparatus is capable of detecting a position of a body part, extracting a rank-order feature, calculating a likelihood for each of the plurality of behaviors, and determining a behavior, for which a sum of squares of the likelihood is maximum, as the behavior of the occupant in the vehicle. While an assessment is made using a sum of squares of likelihood in this case, an assessment may be made using a simple sum or a product instead.

A second embodiment of the present invention is a learning apparatus for learning the discriminator used in the behavior recognition apparatus described above, the learning apparatus including:

an input unit configured to acquire positions of a plurality of body parts of a person inside a vehicle in a vehicle interior image obtained by photographing a vehicle interior and a correct behavior taken by the person inside the vehicle;

a feature extraction unit configured to extract a rank-order feature which is a feature based on a rank-order of a magnitude of a distance between body parts; and a learning unit configured to learn a discriminator for discriminating a behavior of an occupant in the vehicle based on the rank-order feature extracted by the feature extraction unit and the correct behavior.

In a similar manner to the first embodiment, the distance between parts may be a distance in the vehicle interior image (a two-dimensional distance) or a three-dimensional distance which also takes depth information into consideration. When adopting a three-dimensional distance, depth information must also be used. Moreover, the detection of a position of a body part may be performed by the learning apparatus or may be performed manually by a person.

In the present embodiment, the discriminator may also be learned by using also input data obtained by adding a minute fluctuation to positions of the plurality of body parts as learning data representing a same correct behavior. By preparing learning data to which noise is added in this manner, a discriminator which is robust with respect to an estimation error of a position of a body part can be generated.

Moreover, the present invention can be considered as a behavior recognition apparatus or a learning apparatus which includes at least a part of the units described above. In addition, the present invention can also be considered as a behavior recognition method or a learning method which executes at least a part of the processes described above. Furthermore, the present invention can also be considered as a computer program that causes these methods to be executed by a computer or a computer-readable storage unit that non-transitorily stores the computer program. The respective units and processes described above can be combined with one another to the greatest extent feasible to constitute the present invention.

According to the present invention, accuracy of behavior recognition of an occupant in a vehicle can be improved. In particular, an adverse effect of a fluctuation due to an environmental factor inside a vehicle such as a horizontal movement of a seat position, a difference in physiques among occupants, and a position or an orientation of a camera, an estimation error of a position of a body part, and the like can be suppressed.

Further features of the present invention will become apparent from the following description of exemplary embodiments with reference to the attached drawings.

BRIEF DESCRIPTION OF THE DRAWINGS

FIG. 2 shows a flowchart of a learning process performed by the learning apparatus 2;

FIG. 8 shows a flow chart of a behavior recognition process performed by the behavior recognition apparatus 1.

DESCRIPTION OF THE EMBODIMENTS

[Outline of Configuration]

Figure 1A:
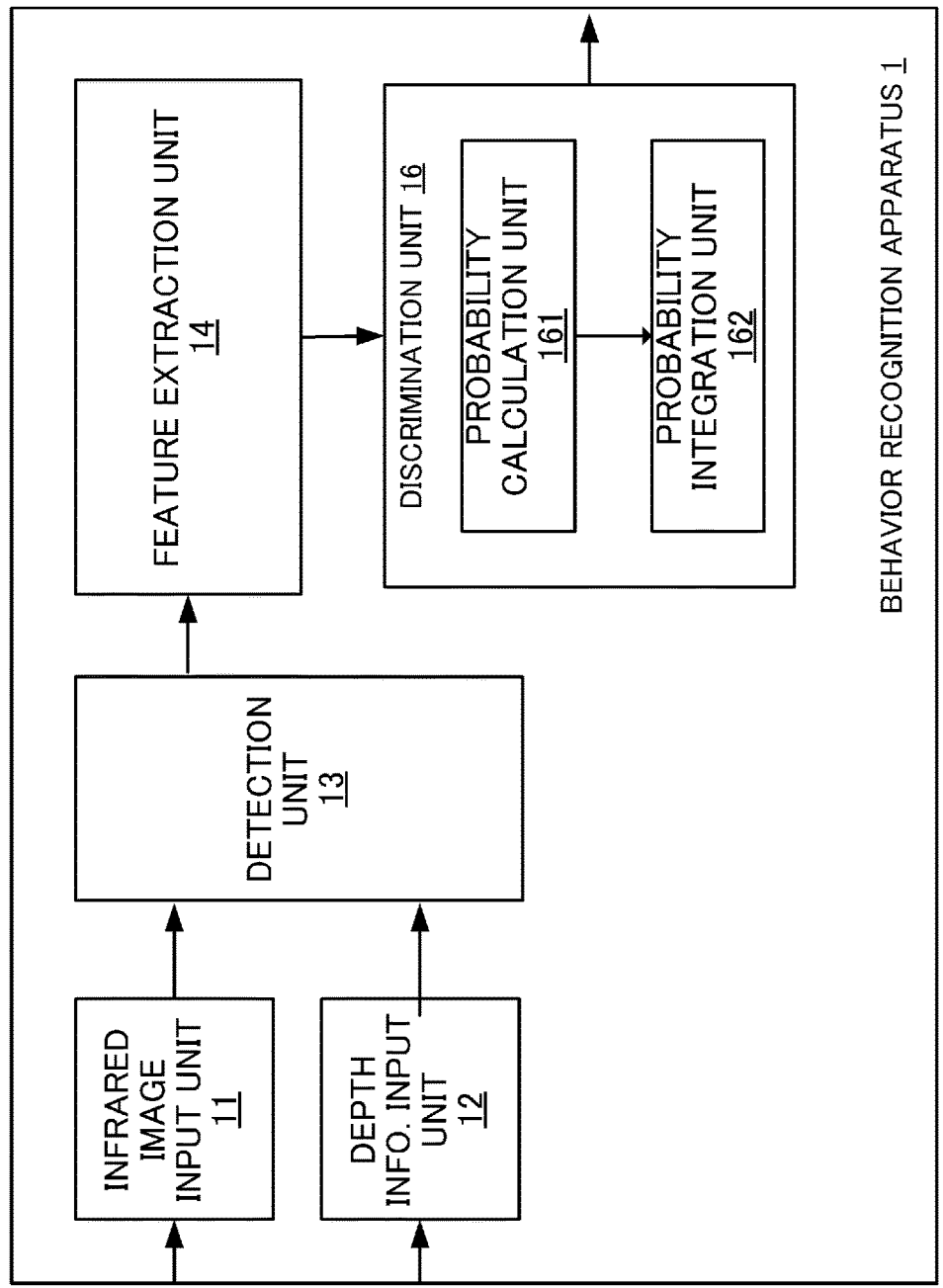
FIG. 1A shows a functional configuration diagram of a behavior recognition apparatus 1 and FIG. 1B a functional configuration diagram of a learning apparatus 2 according to an embodiment.

Hereinafter, an embodiment of the present invention will be described with reference to the drawings. FIG. 1A is a block diagram showing an outline of a configuration of a behavior recognition apparatus 1 according to the present embodiment. The behavior recognition apparatus 1 can be realized using a semiconductor integrated circuit (LSI). In this case, as shown in FIG. 1A, the behavior recognition apparatus 1 includes an infrared image input unit 11, a depth information input unit 12, a detection unit 13, a feature extraction unit 14, and a discrimination unit 16. The discrimination unit 16 includes a probability calculation unit 161 which obtains a probability (likelihood) of each discrimination target behavior from a single image and a probability integration unit 162 for identifying a behavior of an occupant in a vehicle from images of a plurality of frames. These components respectively correspond to functions realized by the behavior recognition apparatus 1.

Figure 1B:
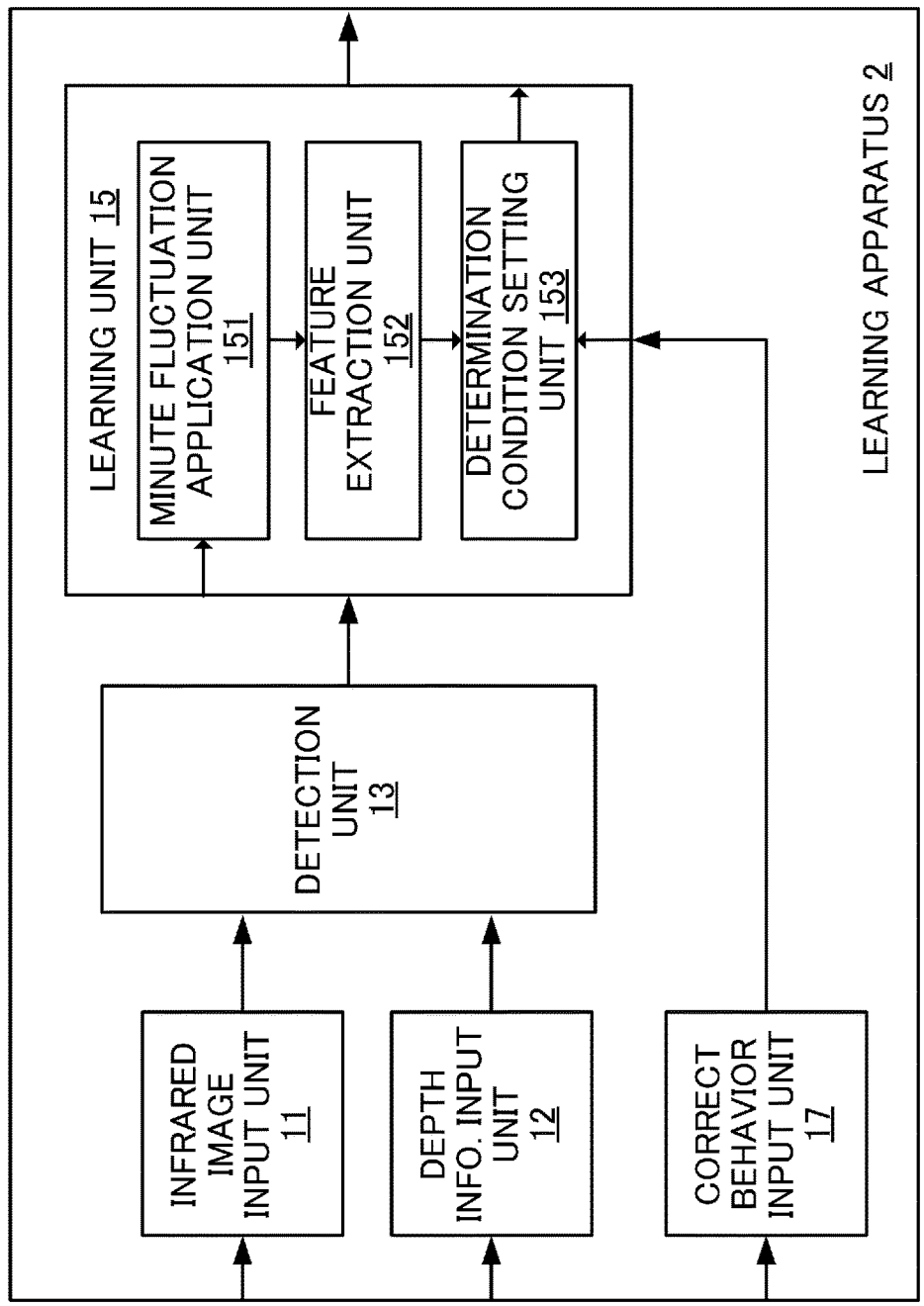

FIG. 1B is a block diagram showing an outline of a configuration of a learning apparatus 2 for generating the probability calculation unit 161 (a discriminator) of the discrimination unit 16. The learning apparatus 2 can be realized using a semiconductor integrated circuit (LSI). In this case, as shown in FIG. 1B, the learning apparatus 2 includes the infrared image input unit 11, the depth information input unit 12, the detection unit 13, a learning unit 15, and a correct behavior input unit 17. The learning unit 15 includes a minute fluctuation application unit 151, a feature extraction unit 152, and a determination condition setting unit 153. In the present description, functional blocks similar to those of the behavior recognition apparatus 1 among the functional blocks of the learning apparatus 2 are assigned similar reference numerals.

Each of these functional units will be described together with descriptions of a learning process and a behavior recognition process presented below.

[Learning Process]

First, a learning process performed by the learning apparatus 2 will be described. FIG. 2 is a flow chart showing a flow of the learning process.

In step S10, the learning apparatus 2 acquires a moving image of infrared images and depth information (range images) containing a behavior, the correct recognition result (correct behavior) of which is known. The infrared images are input from the infrared image input unit 11, the depth information is input from the depth information input unit 12, and the correct behavior is input from the correct behavior input unit 17.

Figure 3:
FIG. 3 shows an example of an infrared image input to an infrared image input unit 11.

As shown in FIG. 3, the infrared image input unit 11 acquires infrared images of the inside of a vehicle (hereinafter, infrared images) input from outside of the behavior recognition apparatus 1 and outputs an infrared image I(t) at a time point t (t=1, 2, . . . , T) to the detection unit 13. Infrared images may be acquired from an infrared camera installed inside the vehicle. Moreover, while infrared images are used in the present embodiment, visible light images may be used.

The depth information input unit 12 acquires depth information of the inside of the vehicle (hereinafter, depth information) input from outside of the behavior recognition apparatus 1 and outputs depth information D(t) at an obtained time point t (t=1, 2, . . . , T) to the detection unit 13. In this case, the depth information D(t) may be acquired by installing a commercially-available stereoscopic camera, a time-of-flight (TOF) sensor, or the like inside the vehicle.

A correct behavior (correct category) of a presently-input infrared image and depth information is input to the correct behavior input unit 17. Examples of a correct behavior include an operation of a steering wheel, an adjustment of a rearview mirror, an adjustment of a control panel, wearing and removing a seat belt, an operation of a smartphone, and eating and drinking.

Processes of a loop L1 constituted by steps S11 to S13 are performed on each frame of an input moving image as a target.

In step S11, the detection unit 13 detects a body part from the infrared image I(t) and the depth information D(t).

Figure 4:
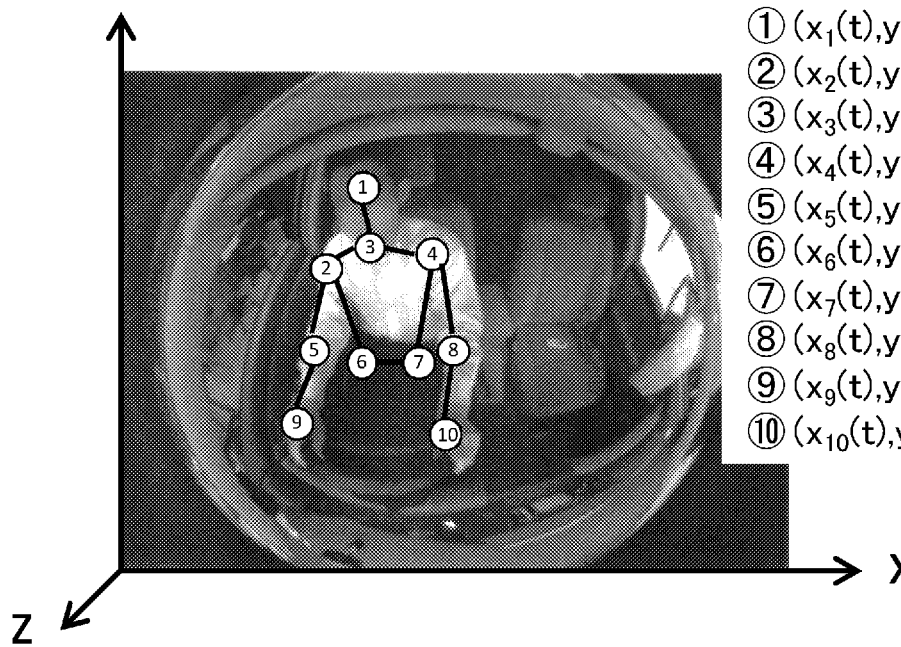
FIG. 4 shows an example of a result of detection by the detection unit 13.

As shown in FIG. 4, based on the infrared image I(t) obtained by the infrared image input unit 11 and the depth information D(t) obtained by the depth information input unit 12, the detection unit 13 detects two-dimensional coordinates $(x_m(t), y_m(t))$ (m=1, 2, . . . , M) of M-number of parts of an occupant in a vehicle and outputs the same to the learning unit 15.

In this case, $x_m(t)$ represents a horizontal coordinate in the infrared image I(t) of an m-th part at a time point t. In addition, $y_m(t)$ represents a vertical coordinate in the infrared image I(t) of the m-th part at the time point t. Meanwhile, $z_m(t)$ represents a depth-direction coordinate of the m-th part at the time point t and is given as a value on the two-dimensional coordinates $(x_m(t), y_m(t))$ in the depth information D(t).

Specifically, for example, as described in Scwarz et al. [3], the two-dimensional coordinates $(x_m(t), y_m(t))$ (m=1, 2, . . . , M) of the M-number of parts of an occupant in a vehicle may be detected using a discriminator $C_1$ generated in advance for detecting the two-dimensional coordinates $(x_m(t), y_m(t))$ (m=1, 2, . . . , M) of the M-number of parts of an occupant in a vehicle. The discriminator $C_1$ can be generated using a large amount of learning data to which the two-dimensional coordinates $(x_m(t), y_m(t))$ (m=1, 2, . . . , M) and the depth-direction coordinates $z_m(t)$ (m=1, 2, . . . , M) of the M-number of parts of an occupant in a vehicle are assigned.

Alternatively, as described in Toshev et al. [4], the two-dimensional coordinates $(x_m(t), y_m(t))$ (m=1, 2, . . . , M) of the M-number of parts of an occupant in a vehicle may be detected using a discriminator $C_2$ generated in advance for detecting the two-dimensional coordinates $(x_m(t), y_m(t))$ (m=1, 2, . . . , M) of the M-number of parts of an occupant in a vehicle. The discriminator $C_2$ can be generated using a large amount of learning data to which the two-dimensional coordinates $(x_m(t), y_m(t))$ (m=1, 2, . . . , M) of the M-number of parts of an occupant in a vehicle are assigned.

In step S12, the minute fluctuation application unit 151 of the learning unit 15 adds a minute fluctuation to the two-dimensional coordinates $(x_m(t), y_m(t))$ (m=1, 2, . . . , M) of the M-number of parts of an occupant in a vehicle obtained by the detection unit 13 to create K-number of pieces of learning data $D_k(t)$ (k=1, 2, . . . , K) which are similar to, but differ from, each other. The correct behavior remains the same as that input to the correct behavior input unit 17 even after the minute fluctuation is added.

Figure 5:
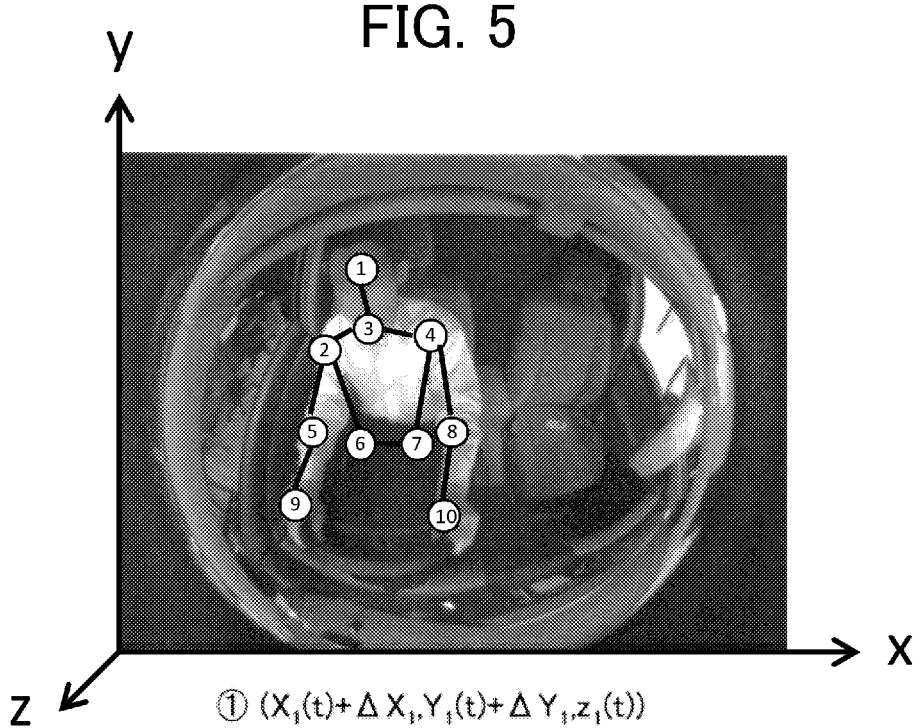
FIG. 5 shows an example of a result of application of a minute fluctuation by a minute fluctuation application unit 151.

As shown in FIG. 5, the minute fluctuation application unit 151 creates the K-number of pieces of learning data $D_k(t)$ (k=1, 2, . . . , K) which are similar to, but differ from, each other by adding a minute fluctuation $(\Delta x_{m,k}(t), \Delta y_{m,k}(t))$ (m=1, 2, . . . , M, k=1, 2, . . . , K) to the two-dimensional coordinates $(x_m(t), y_m(t))$ (m=1, 2, . . . , M) of the M-number of parts of an occupant in a vehicle obtained by the detection unit 13, and outputs the learning data $D_k(t)$ to the feature extraction unit 152.

In this case, $\Delta x_{m,k}(t)$ represents a minute fluctuation with respect to the horizontal direction of the m-th part and a magnitude thereof is given by a random value equal to or smaller than a maximum value $\Delta x_{max}$ determined in advance and differs in value for each k (=1, 2, . . . , K). In addition, $\Delta y_{m,k}(t)$ represents a minute fluctuation with respect to the vertical direction of the m-th part and a magnitude thereof is given by a random value equal to or smaller than a maximum value $\Delta y_{max}$ determined in advance and differs in value for each k (=1, 2, . . . , K). Furthermore, the maximum values $\Delta x_{max}$ and $\Delta y_{max}$ are respectively determined heuristically.

In step S13, the feature extraction unit 152 extracts K-number of rank-order features $F_k(t)$ (k=1, 2, . . . , K) based on the K-number of pieces of learning data $D_k(t)$ (k=1, 2, . . . , K). Specifically, the rank-order feature F(t) is extracted using Expression (1) below.

$$F(t)=(R(D(1,2)),R(D(1,3)), \ldots ,R(D(8,9)),R(D(9,10))) \quad (1)$$

Figure 6A:
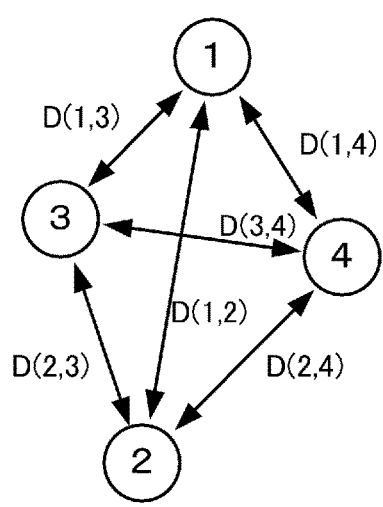
FIGS. 6A and 6B illustrate a rank-order feature based on a rank-order of a magnitude of a distance between parts.

In Expression (1), D(m, n) represents a Euclidean distance on an infrared image space between the m-th part and an n-th part, and R(D(m, n)) represents a rank-order of D(m, n) when D(1, 2), D(1, 3), . . . , D(8, 9), D(9, 10) are sorted in a descending order. For example, for the sake of convenience, let us consider four parts as shown in FIG. 6A and assume that a distance D(t) between all pairs of parts is given by $$D(t) = (D(1, 2), D(1, 3), D(1, 4), D(2, 3), D(2, 4), D(3, 4))$$
$$= (5.5, 2.6, 2.8, 3.5, 4.3, 4.0).$$

In this case, the rank-order feature F(t) at the time point t can be extracted as F(t)=(1, 5, 6, 4, 3, 2).

Figure 6B:
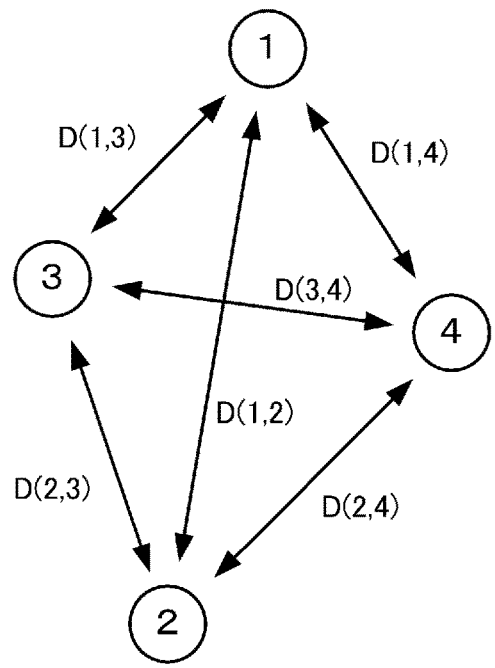
Figure 7:
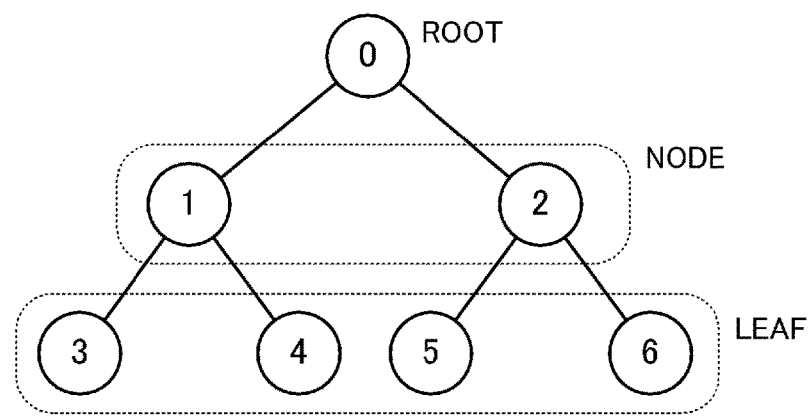
FIG. 7 illustrates a decision tree model.

The rank-order feature F(t) is characteristically invariable with respect to a scale fluctuation of a position of a body part as shown in FIG. 6B and is robust with respect to a minute fluctuation. In other words, since the rank-order feature F(t) is dependent only on a rank-order of a distance between body parts, the rank-order feature F(t) is invariable even when a scale fluctuation such as enlargement and reduction occurs. In addition, even when a position of a body part fluctuates minutely, the rank-order feature F(t) is invariable as long as the fluctuation does not affect the rank-order of the body part. Due to such characteristics, an effect of various fluctuations which occur when estimating a behavior of an occupant in a vehicle such as a horizontal movement of a seat position, a difference in physiques among occupants, and a position or an orientation of a camera, an effect of an estimation error of a position of a body part by deep learning, and other effects can be suppressed.

Due to the processes of steps S11 to S13 described above, a plurality of pieces of learning data $D_k(t)$ are created for an image corresponding to a single frame and the rank-order feature F(t) is determined for each piece of learning data $D_k(t)$. In addition, the processes are executed for each frame of the input moving image by repetitively performing the loop L1.

In step S14, the determination condition setting unit 153 of the learning unit 15 generates a discriminator $C_3$ with respect to a discrimination category c (=1, . . . , C) using K×T-number of rank-order features $F_k(t)$ (k=1, 2, . . . , K, t=1, 2, . . . , T) obtained by the feature extraction unit 152 and a correct category corresponding to each rank-order feature $F_k(t)$. In the present embodiment, the discriminator $C_3$ is generated using decision tree learning and, particularly, using Random. Forests such as described in Breiman [5].

Random Forests refer to a type of group learning algorithms which use a decision tree as a weak discriminator and are constituted by a plurality of nodes r (=1, . . . , R) and links connecting the nodes. A node on a topmost layer is referred to as a root node, a node on a bottommost layer is referred to as a leaf node, and others are simply referred to as nodes. Each node stores, by learning, a determination condition $\Phi_r$ (r=1, . . . , R) for sorting a rank-order feature in the node to a left-side node or a right-side node and a probability $P_r(c)$ (r=1, . . . , R) with respect to a discrimination category c (=1, . . . , C).

In this case, the discrimination category c (=1, . . . , C) refers to a correct behavior that is input to the correct behavior input unit 17. The discrimination category may be appropriately set based on a context of behavior recognition of an occupant in a vehicle. Examples of settings may include "c=1: operation of a steering wheel", "c=2: adjustment of a rearview mirror", "c=3: adjustment of a control panel", "c=4: wearing and removing a seat belt", "c=5: operation of a smartphone", and "c=6: eating and drinking".

In addition, candidates $\phi_m$ (m=1, . . . , M) of a determination condition necessary for learning by Random Forests are set using an i-th element I and a j-th element J of the rank-order feature F(t) and a threshold $\tau$ for comparing magnitudes of the element I and the element J. A specific determination condition or, in other words, values of i, k, and $\tau$ in $\phi_m$ are randomly determined.

The determination condition is used to determine to which child node a transition is to be made from each node constituting a decision tree. Specifically, magnitudes of the i-th element I and the j-th element J of the rank-order feature F(t) are compared with each other and: when I−J>$\tau$ is satisfied, a transition is made to a right-side node; but when I−J>$\tau$ is not satisfied, a transition is made to a left-side node. For example, when a determination condition (i, j, $\tau$)=(1, 5, 1) is applied to the rank-order feature F(t)=(1, 5, 6, 4, 3, 2), since the i-th (=1st) element I=5 and the j-th (=5th) element J=2 satisfy I−J=5−2=3>1=$\tau$, a transition is made to the right-side node. In a similar manner, when a determination condition (i, j, $\tau$)=(1, 0, 7) is applied, since the i-th (=1st) element I=5 and the j-th (=0th) element J=1 satisfy I−J=5−1=4<7=$\tau$, a transition is made to the left-side node.

Once candidates $\phi_m$ (m=1, . . . , M) of a determination condition are obtained as described above, learning may be subsequently performed according to procedures determined in Breiman [6]. In this case, learning refers to setting an appropriate determination condition $\Phi_r$ (r=1, . . . , R) for each node r (=1, . . . , R) and setting a probability $P_r(c)$ (r=1, . . . , R) with respect to a discrimination category c (=1, . . . , C). Specifically, as the determination condition $\Phi_r$ (r=1, . . . , R) of an r-th node, a candidate $\phi_m$ for which reliability G($\phi$) defined by Expression (2) below is maximum among the candidates $\phi_m$ (m=1, . . . , M) of a determination condition may be set.

[Math. 2]

$$G(\phi) = H(Q) - \sum_{s \in \{l,r\}}^{|Q_s(\phi)|} H(Q_s(\phi)) \qquad (2)$$

In this case, $Q_l(\phi)$ represents the number of samples which make a transition to a left-side node under a determination condition $\phi$, $Q_r(\phi)$ represents the number of samples which make a transition to a right-side node under the determination condition $\phi$, H(Q($\phi$)) represents information entropy with respect to a discrimination category at a prescribed node, H($Q_l(\phi)$) represents information entropy with respect to a discrimination category of a sample having made a transition to a left-side node under the determination condition $\phi$, and H($Q_r(\phi)$) represents information entropy with respect to a discrimination category of a sample having made a transition to a right-side node under the determination condition $\phi$.

Finally, the determination condition $\Phi_r$ (r=1, . . . , R) for each node r (=1, . . . , R) in Random Forests and the probability $P_r(c)$ (r=1, . . . , R) with respect to the discrimination category c (=1, . . . , C) are determined. The process described above is performed a plurality of times by varying a subset of learning data used in learning and the candidate $\phi_m$ of the determination condition to create a plurality of decision trees. A discrimination result of a discriminator (corresponding to the probability calculation unit 161 of the discrimination unit 16) is an integration of the probability $P_r(c)$ with respect to the discrimination category c obtained by each decision tree.

[Behavior Recognition Process]

Next, a behavior recognition process performed by the behavior recognition apparatus 1 will be described. FIG. 8 is a flow chart showing a flow of the behavior recognition process.

In step S20, the behavior recognition apparatus 1 acquires a moving image of infrared images and depth information (range images) with respect to a behavior which is to be recognized. Acquisition of infrared images and depth information is basically similar to the acquisition during the learning process.

Processes of a loop L2 constituted by steps S21 to S23 are performed on each frame of an input moving image as an object.

In step S21, the detection unit 13 detects two-dimensional positions of body parts. In step S22, the feature extraction unit 14 extracts a rank-order feature based on a rank-order of a distance between body parts. The processes of steps S21 and S22 are similar to the processes of steps S11 and S12 in the learning process.

In step S23, the probability calculation unit 161 learned by the learning apparatus 2 obtains a probability corresponding to each recognition category c (=1, ..., C) of the rank-order feature extracted by the feature extraction unit 14. A rank-order feature newly input by the feature extraction unit 14 will be denoted by F(t'). The correct recognition category of the rank-order feature F(t') is unknown. The probability calculation unit 161 calculates a probability P(t', c) with respect to the recognition category c (=1, ..., C) of the rank-order feature F(t') (t'=1, ..., T') based on the determination condition $\Phi_r$ (r=1, ..., R) for each node r (=1, ..., R) in Random Forests obtained by the learning unit 15 and the probability $P_r(c)$ (r=1, ..., R) with respect to the discrimination category c (=1, ..., C). The calculated probability P(t', c) is output to the probability integration unit 162.

Specifically, the probability P(t', c) is given as a probability $P_{r'}(c)$ of a leaf node r' (where r' is any one of 1 to R) which is eventually reached when sequentially tracing nodes from a root node in accordance with the determination condition $\Phi_r$ (r=1, ..., R) for each node r (=1, ..., R) in Random Forests obtained by the learning unit 15.

In step S24, the probability integration unit 162 determines a behavior of an occupant in a vehicle in the input moving image based on a discrimination result (a probability for each category) of L-number of most recent frames. Specifically, by integrating the probability P(t', c) with respect to the recognition category c (=1, ..., C) at the time point t' obtained by the probability calculation unit 161 for L-number of frames in the time direction, the probability integration unit 162 determines which recognition category c (=1, ..., C) the rank-order feature F(t') belongs to. Specifically, a recognition category c(F(t')) (any one of 1 to C) to which the rank-order feature F(t') belongs may be determined using Expression (3).

[Math. 3]

$$c(F(t')) = \underset{c \in 1, \ldots, C}{\arg\max} \sum_{l=t'-L}^{l=t'} (P(l, c))^2 \quad (3)$$

In this case, a sum of squares is obtained instead of a simple sum with respect to the probability P(t', c) in Expression (3) in order to highlight a difference between two recognition categories when the recognition categories are similar to, but differ from, each other. In addition, the value of L may be heuristically determined.

By utilizing the behavior recognition apparatus 1, the behavior recognition result c(F(t')) of an occupant in a vehicle obtained in this manner is transmitted to a higher level apparatus and applied to various applications which use a behavior of an occupant in a vehicle as an input. For example, the behavior recognition result c(F(t')) is applied to recognize dangerous behavior such as the occupant in a vehicle operating a smartphone or drinking and eating and to adaptively alert the occupant in a vehicle by collating the dangerous behavior with a traveling state of the vehicle. Moreover, the unit described above corresponds to an example of the behavior recognition apparatus 1.

In the present embodiment, since a rank-order of a magnitude of a distance between parts is used as a feature, accurate behavior recognition can be performed. This is because the rank-order of a magnitude of a distance is invariable even when a scale fluctuation such as enlargement or reduction, a rotation, or a translation occurs and is robust with respect to a minute fluctuation of parts. Due to such characteristics, an effect of various fluctuations which occur when estimating a behavior of an occupant in a vehicle such as a horizontal movement of a seat position, a difference in physiques among occupants, and a position or an orientation of a camera, an effect of an estimation error of a position of a body part by deep learning, and other effects can be suppressed.

[Modification]

In the description provided above, a two-dimensional position $(x_m(t), y_m(t))$ is obtained as a position of a body part and, therefore, a distance on an xy plane is also used as a distance between body parts. However, it is also preferable to obtain a position of a body part three-dimensionally and to use a distance in a three-dimensional space as a distance between parts. In this case, when adding a minute fluctuation to a position of a part in a learning process, a random value may be added to each of x, y, and z components or random values may be added to the x and y components while a value of $(x_m(t)+\Delta_{m,k}(t), y_m(t)+\Delta y_{m,k}(t))$ in depth information D(t) may be adopted as the z component.

In addition, a position of a body part used in a learning process or a behavior recognition process may be obtained in any way. This means that, in addition to algorithms for part detection not being limited to a specific algorithm, part detection may also be performed manually. Nevertheless, in a behavior recognition process, desirably, the detection of a body part is performed by a machine to enable real-time processing.

Furthermore, while the probability integration unit 162 determines a recognition result of a final behavior category based on a sum of squares of a probability P(t', c) in each frame, the recognition result of a final behavior category may instead be determined based on a simple sum or a product (or an arithmetic mean or a geometric mean).

In addition, while a case of adopting Random Forests as an example of decision tree learning has been described above, other decision tree learning algorithms such as ID3 and CART may be used instead.

Furthermore, adoptable learning processes are not limited to decision tree learning and other arbitrary statistical machine learning processes may be used. Statistical machine learning refers to a learning process of generating a model for discriminating classes of input data based on a statistical method from learning data. For example, a multi-class Support Vector Machine such as that described in Weston et al., [6] can be used. Alternatively, a least squares probabilistic classification method such as that described in Sugiyama [7] can be used. Alternatively, Bayesian estimation, neural networking, and the like can also be used.

The behavior recognition apparatus 1 and the learning apparatus 2 according to the present invention are not limited to implementations using a semiconductor integrated circuit (LSI) and may be realized when a program is executed by a computer having a general-purpose microprocessor and a general-purpose memory. In addition, while the behavior recognition apparatus 1 and the learning apparatus 2 are described as separate apparatuses in the description given above, a single apparatus may be configured so as to be switchable between a learning mode and a recognition mode.

What is claimed is:

1. A behavior recognition apparatus comprising:
   a processor programmed to:
      detect, based on a vehicle interior image obtained by photographing a vehicle interior, positions of a plurality of body parts of a person inside a vehicle in the vehicle interior image;

calculate distances between the detected positions of each of the plurality of body parts relative to each other, such that distances between all combinations of the plurality of body parts is calculated;

calculate a rank-order feature that ranks magnitudes the calculated distances between each combination of the detected positions of the plurality of body parts; and discriminate a behavior of an occupant in the vehicle based on using the calculated rank order feature as an input to a discriminator learned in advance, which recognizes the behavior of the occupant inside the vehicle as an output of the discriminator.

2. The behavior recognition apparatus according to claim 1, wherein the discriminator is learned by decision tree learning and is configured based on a magnitude relationship between a rank-order of the magnitude of the distance between a first pair of body parts and a rank-order of the magnitude of the distance between a second pair of body parts.

3. The behavior recognition apparatus according to claim 1, wherein the discriminator is configured based on statistical machine learning.

4. The behavior recognition apparatus according to claim 1, wherein the processor is programmed to:
calculate a likelihood for each of a plurality of behaviors determined in advance, and
with respect to images of a plurality of frames constituting a moving image:
detect a position of a body part,
extract the rank-order feature,
calculate a likelihood for each of the plurality of behaviors, and
determine a behavior, for which a sum of squares of the likelihood is maximum, as the behavior of the occupant in the vehicle.

5. A processor programmed to:
acquire positions of a plurality of body parts of a person inside a vehicle in a vehicle interior image obtained by photographing a vehicle interior, and a correct behavior taken by the person;
calculate distances between the acquired positions of each of the plurality of body parts relative to each other, such that distances between all combinations of the plurality of body parts is calculated;
calculate a rank-order feature that ranks magnitudes of the acquired distances between each combination of the detected positions of the plurality of body parts; and
learn a discriminator that discriminates a behavior of an occupant in the vehicle based on using the rank-order feature and the correct behavior as inputs to the discriminator, which recognizes the behavior of the occupant inside the vehicle as an output of the discriminator.

6. The learning apparatus according to claim 5, wherein the processor is programmed to learn the discriminator by decision tree learning based on a magnitude relationship between a rank-order of the magnitude of the distance between a first pair of body parts and a rank-order of the magnitude of the distance between a second pair of body parts.

7. The learning apparatus according to claim 5, wherein the processor is programmed to learn the discriminator based on statistical machine learning.

8. The learning apparatus according to claim 5, wherein the discriminator is learned by using input data obtained by adding a minute fluctuation to positions of the plurality of body parts in the vehicle interior image as learning data representing a same correct behavior.

9. A behavior recognition method comprising steps of:
detecting, based on a vehicle interior image obtained by photographing a vehicle interior, positions of a plurality of body parts of a person inside a vehicle in the vehicle interior image;
calculating distances between the detected positions of each of the plurality of body parts relative to each other, such that distances between all combinations of the plurality of body parts is calculated;
calculating a rank-order feature that ranks magnitudes of the calculated distances between each combination of the detected positions of the plurality of body parts; and
discriminating a behavior of an occupant in the vehicle based on using the calculated rank order feature as an input to a discriminator learned in advance, which recognizes the behavior of the occupant inside the vehicle as an output of the discriminator.

10. The behavior recognition method according to claim 9, wherein the discriminator is learned by decision tree learning and is configured based on a magnitude relationship between a rank-order of the magnitude of the distance between a first pair of body parts and a rank-order of the magnitude of the distance between a second pair of body parts.

11. The behavior recognition method according to claim 9, wherein the discriminator is configured based on statistical machine learning.

12. The behavior recognition method according to claim 9, wherein:
the step of detecting the positions of the plurality of body parts and the step of calculating the rank-order feature are performed for each frame in a moving image, and
wherein discriminating the behavior of the occupant includes:
calculating a likelihood for each of a plurality of behaviors determined in advance, and
determining a behavior, for which a sum of squares of the likelihood is maximum, as the behavior of the occupant.

13. A learning method comprising steps of:
acquiring positions of a plurality of body parts of a person inside a vehicle in a vehicle interior image obtained by photographing a vehicle interior and a correct behavior taken by the person inside the vehicle;
calculating distances between the acquired positions of each of the plurality of body parts relative to each other, such that distances between all combinations of the plurality of body parts is calculated;
calculating a rank-order feature that ranks magnitudes of the calculated distances between each combination of the detected positions of the plurality of body parts; and
learning a discriminator that discriminates a behavior of an occupant in the vehicle based on using the rank-order feature and the correct behavior as inputs to the discriminator, which recognizes the behavior of the occupant inside the vehicle as an output of the discriminator.

14. The learning method according to claim 13, wherein the discriminator is learned by decision tree learning based on a magnitude relationship between a rank-order of the magnitude of the distance between a first pair of body parts and a rank-order of the magnitude of the distance between a second pair of body parts.

15. The learning method according to claim 13, wherein the discriminator is learned based on statistical machine learning.

16. The learning method according to claim 13, wherein the discriminator is learned by using input data obtained by adding a minute fluctuation to positions of the plurality of body parts in the vehicle interior image as learning data representing a same correct behavior.

* * * * *